E. LANGEN.
Molds for the Manufacture of Hard Sugar.

No. 151,604.  Patented June 2, 1874.

Witnesses
John Becker
Fred Haynes

Eugen Langen

UNITED STATES PATENT OFFICE.

EUGEN LANGEN, OF COLOGNE, PRUSSIA.

IMPROVEMENT IN MOLDS FOR THE MANUFACTURE OF HARD SUGAR.

Specification forming part of Letters Patent No. 151,604, dated June 2, 1874; application filed May 15, 1874.

CASE C.

*To all whom it may concern:*

Be it known that I, EUGEN LANGEN, of Cologne, in the Kingdom of Prussia, have invented an Improvement in Molds for the Manufacture of Hard Sugar, of which the following is a specification:

This invention is an improvement upon the mold described in Letters Patent No. 134,682, issued to me January 7, 1873, for an improvement in the manufacture of loaf or hard sugar, and in which the sugar mass, while in the molds, was subjected alternately to the action of a centrifugal machine, and to that of the claying-liquor in a vacuum-tank; but the invention is more particularly designed to be used in a different process for the same purpose on which a separate application for patent has been made by me simultaneously with this, and in which the claying-liquor is forced upward through the mass in the molds without the aid of a vacuum applied to the latter, said molds, when the sugar mass in them is being so treated, having their smallest faces downward; also, in which process the green sirup is previously expelled from the mass in the molds by centrifugal action and the claying-liquor, after the treatment as above, similarly expelled, the same molds being used throughout these several separate operations, and such molds being those into which the sugar mass is run from the vacuum-pans to crystallize and cool.

This improved mold, like that described in my Patent No. 134,682, hereinbefore referred to, is transversely of segmental form with a movable bottom, held in place by clamps; or, in other words, is of a tapering internally-truncated shape, open on its opposite faces or sides, and a removable lid or bottom with an intervening packing applied to the larger of such open faces; but it is differently constructed to my previous mold in its lid or cover being provided with inclines running in reverse directions relatively to the length of the mold over opposite margins of the latter, whereby increased facility is afforded for securing and removing the removable lid or bottom, and for equalizing the pressure or strain, so as to insure a close joint when the lid is on the mold.

Figure 1:
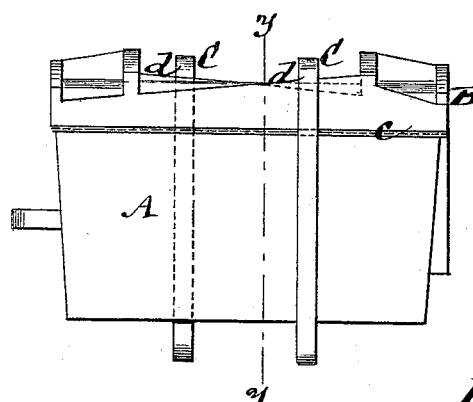
Figure 2:
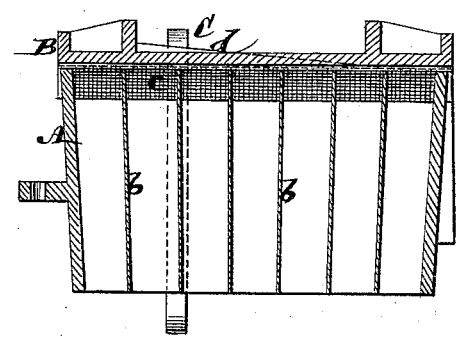
Figure 3:
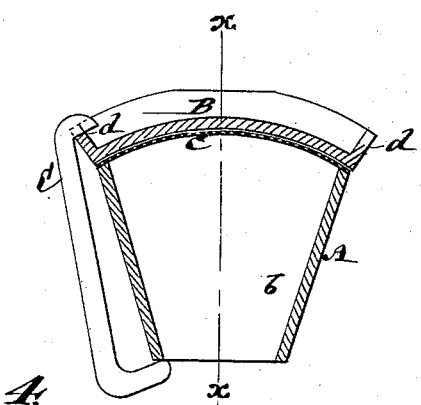
Figure 4:
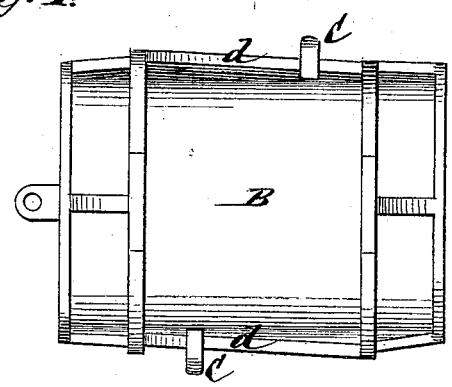

In the accompanying drawing, Figure 1 represents a side view of a mold constructed in accordance with my invention. Fig. 2 is a central longitudinal section of the same, on the line $x\ x$; Fig. 3, a transverse vertical section thereof on the line $y\ y$; and Fig. 4, an outside face view from the lid side of the mold.

Similar letters of reference indicate corresponding parts.

A is the body or frame of the mold, made tapering on its sides or sides and ends, and of sector-like or inner truncated-sector shape in its transverse section, so that a number of these frames placed on end and side by side will form an inner circular wall to a centrifugal drum or machine. Into these frames, by means of grooves or suitable projections, may be fitted loose plates $b$, to divide the frame in sundry compartments, for the purpose of separating the sugar mass into slabs. The smaller inner face of said frame and larger curved outer face thereof are both left open, and after the frame has been fitted with its plates $b$, as described, an india-rubber, canvas, or other suitable packing, $c$, is placed over the curved and larger open face of the mold, and a removable lid or cover, B, fitted thereon and held to form a close joint with the body of the frame or mold by means of two or more clamp-hooks, C, on opposite sides of the mold, and arranged to bear on the edges of the smaller open face of the mold and on inclines $d$ made upon the exterior of the lid on its opposite sides and inclining in reverse directions relatively to the length of the mold, so that on tightening up the clamp-hooks by driving them along the mold in reverse directions on opposite sides, the lids B will not only be firmly held to their places, but the pressure or strain be equally divided on opposite sides of the mold.

The mold is closed by the lid or cover when the sugar mass is first run into it from the vacuum-pans; but said lid is removed when treating the sugar mass within the molds to purging or draining actions in the centrifugal machine; also, when cleansing the sugar mass in the molds by forcing the claying-liquor up through it with the largest faces of the molds uppermost; but the lids not being removed when claying by the vacuum process described in my Patent No. 134,682, when the position of the molds is reversed—that is, their smallest faces uppermost.

I claim—

A tapering internally-truncated sector-shaped mold or frame open on opposite sides, as described, in combination with a lid applied to its larger curved outer side or face, and provided with inclines running in reverse directions relatively to the length of the mold for securing the lid by clamp-hooks applied to the sides of the mold, substantially as specified.

EUGEN LANGEN.

Witnesses:
 ALB. LANGEN,
 C. KURTZ.